(12) United States Patent
Yan et al.

(10) Patent No.: US 12,237,796 B2
(45) Date of Patent: Feb. 25, 2025

(54) METHOD FOR MODEL PREDICTIVE CURRENT CONTROL OF TWO-MOTOR TORQUE SYNCHRONIZATION SYSTEM

(71) Applicant: ZHEJIANG UNIVERSITY, Zhejiang (CN)

(72) Inventors: Yan Yan, Hangzhou (CN); Shujing Li, Hangzhou (CN); Zhen Zhang, Hangzhou (CN); Tingna Shi, Hangzhou (CN); Peng Song, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 161 days.

(21) Appl. No.: 18/084,550

(22) Filed: Dec. 20, 2022

(65) Prior Publication Data

US 2023/0124500 A1 Apr. 20, 2023

Related U.S. Application Data

(63) Continuation of application No. PCT/CN2020/137835, filed on Dec. 20, 2020.

(30) Foreign Application Priority Data

Oct. 29, 2020 (CN) .......................... 202011184109.7

(51) Int. Cl.
G05B 19/427 (2006.01)
H02P 5/50 (2016.01)
(Continued)

(52) U.S. Cl.
CPC ............ *H02P 5/50* (2013.01); *H02P 21/0017* (2013.01); *H02P 21/22* (2016.02)

(58) Field of Classification Search
CPC ........ H02P 5/50; H02P 21/0017; H02P 21/22; H02P 5/747; H02P 6/04; H02P 6/34;
(Continued)

(56) References Cited

U.S. PATENT DOCUMENTS 8,278,854 B2 10/2012 Imura
2015/0311845 A1 10/2015 Nagata et al.
2021/0061249 A1* 3/2021 Wang .................. B60L 15/2045

FOREIGN PATENT DOCUMENTS

CN 103762926 A 4/2014
CN 105007014 A 10/2015
(Continued)

OTHER PUBLICATIONS

International Search Report ( PCT /CN2020/137835); Date of Mailing: Aug. 3, 2021.
(Continued)

*Primary Examiner* — Muhammad S Islam
(74) *Attorney, Agent, or Firm* — W&G Law Group

(57) ABSTRACT

A method for model predictive current control of a two-motor torque synchronization system, which belongs to the field of power electronics and motor control. The present disclosure takes an indirect matrix converter and a two-motor system which are coaxially and rigidly connected as a target, and takes two-motor torque synchronization performance and current tracking performance as main control objectives. A two-motor unified prediction model is established and a value function based on free components of error items is configured so as to solve the problems in which when model predictive current control is performed on a two-motor system, setting of a value function weighting coefficient needs to be performed manually, and consequently the setting process is complicated and an erroneous switch state combination is likely to be selected.

8 Claims, 2 Drawing Sheets

(51) Int. Cl.
*H02P 21/00* (2016.01)
*H02P 21/22* (2016.01)

(58) Field of Classification Search
CPC ........ H02P 21/14; H02P 21/20; H02P 25/024; H02P 27/08; H02P 2006/045
See application file for complete search history.

(56) References Cited

FOREIGN PATENT DOCUMENTS

| | | | |
|---|---|---|---|
| CN | 106849794 | A | 6/2017 |
| CN | 106953570 | A | 7/2017 |
| CN | 107276475 | A | 10/2017 |
| CN | 109495050 | A | 3/2019 |
| CN | 111585477 | A | 8/2020 |
| DE | 102016211473 | A1 | 12/2017 |

OTHER PUBLICATIONS

Notice Of Allowance(CN202011184109.7); Date of Mailing: Sep. 17, 2021.

\* cited by examiner

METHOD FOR MODEL PREDICTIVE CURRENT CONTROL OF TWO-MOTOR TORQUE SYNCHRONIZATION SYSTEM

CROSS-REFERENCE TO RELATED APPLICATIONS

The present application is a continuation of International Application No. PCT/CN2020/137835, filed on Dec. 20, 2020, which claims priority to Chinese Application No. 202011184109.7, filed on Oct. 29, 2020, the contents of both of which are incorporated herein by reference in their entireties.

TECHNICAL FIELD

The present disclosure relates to a method for model predictive current control of a two-motor torque synchronization system driven by an indirect matrix converter, belonging to the field of power electronics and motor control.

BACKGROUND

In industrial applications such as shield excavation, steel manufacturing, tunnel construction, etc., it is difficult for a single motor to meet the requirements of heavy load and high torque, so it is necessary to use multiple motors to drive synchronously. The coaxial rigid connection of two motors is one of the most widely used multi-motor controls. The DC bus of the indirect matrix converter can be connected in parallel with several inverter stages to form a multi-motor synchronous driving system, and there is no intermediate DC energy storage link, which can realize the bidirectional flow of energy. It has the advantages of compact structure and high integration, and has great advantages in industrial applications such as paper making and textile, oil drilling and mining, metal rolling, aerospace and so on, which require strict volume of frequency converters. However, due to the inconsistency of motor parameters and the change of internal parameters under different working conditions, the load distribution will be unbalanced, which will seriously affect the synchronous performance of output torque of the system and the safety of equipment. Therefore, it is of great significance to study the torque synchronous performance of the indirect matrix converter-two-motor system. At the same time, with the development of microprocessor, model predictive current control (MPCC) is gradually applied to motor drive system. This method selects the optimal switch combination state of the system through variable prediction and value function evaluation, which is easy to realize multivariable control of the system and has good dynamic response speed and steady-state control accuracy, so it is suitable for the indirect matrix converter-two-motor torque synchronization system. The value of the value function directly determines the selection of the optimal switch combination state, so the selection of the form and weight coefficient of the value function is the key to the predictive control performance of the system.

Traditional MPCC value function usually takes the form of linear weighted summation of error items directly. In the indirect matrix converter-two-motor system, with the increase of control variables, the number of weight coefficients also increases, and the empirical setting method is usually used to select the weight coefficients. However, the traditional MPCC with weighted sum value function and empirical setting method of the weight coefficient has the following problems: (1) there are dimensional differences in each error item in weighted sum value function, and the values of each error item are different, so when the weight coefficient is not reasonable, the system may choose the wrong switch combination state; (2) the empirical setting process of weight coefficient is complicated, and when there are many evaluation indexes defined by the system, there will be problems that all indexes cannot be taken into account, and the choice can only be made by personal experience; (3) when the initial value of the synchronization error weight coefficient covers a wide range and has a large order of magnitude, the number of setting times will increase, and finally, only the approximate range of the synchronization error weight coefficient can be obtained, but its optimal value cannot be determined. Therefore, in order to give consideration to the expected torque synchronization performance and current tracking performance of the two-motor system driven by an indirect matrix converter, and at the same time, to better match the working conditions of the system, it is an urgent problem to find a more effective form of value function and a weight coefficient setting strategy. In view of the above problems, the present disclosure provides a method for model predictive current control for a two-motor torque synchronization system driven by an indirect matrix converter.

SUMMARY

The technical problem to be solved by this application is to propose a method for model predictive current control suitable for an indirect matrix converter-two-motor torque synchronization system. Its value function is novel and its weight coefficient can be adjusted online. This method can better realize system torque synchronization and current control.

The present disclosure adopts the following technical solution:

1) Generating a Pulse Width Modulation (PWM) control signal through a rectifier stage controller by a rectifier stage of the indirect matrix converter adopting a space vector modulation strategy without zero vector, and providing a stable and reliable DC output voltage for an inverter stage of the subsequent indirect matrix converter.

2) Establishing a two-motor unified prediction model by taking the two-motor torque synchronization system driven by two coaxially and rigidly connected motors with a same load as a subject, torque synchronization performance and current tracking performance between the motors as main control objectives, and using a current value of each motor and a torque synchronization error $\epsilon$ between the motors as a state variable.

3) Inputting the state variable and an input voltage of a previous moment, obtaining a predicted value of the state variable at a next moment as an output through the two-motor unified prediction model, analyzing a composition of each error item, analyzing the composition of each error item in a weighted sum value function in a value function evaluation unit for model predictive current control, normalizing each error value by focusing on an offset degree of a free component of each error to a fixed component, and proposing a value function based on the free component of the error item.

4) Proposing an adaptive weight coefficient without artificial iterative comparison and applying the adaptive weight coefficient to a model prediction current control process of the two-motor torque synchronization system for selecting the weight coefficient in the value function based on the free component of the error item; adjusting the weight coefficient online and in real time by an adaptive factor according to the running state of the system, and meeting requirements of various working conditions with expected torque synchronization performance and current tracking performance of the system into account.

The modulation strategy adopted by the indirect matrix converter in step 1) is specifically as follows:

The rectifier stage of the indirect matrix converter adopts an Space Vector Pulse Width Modulation (SVPWM) modulation strategy without zero vector since the objective of the modulation strategy of the rectifier stage so that the voltage polarity of a DC link is positive, in which case the voltage utilization ratio is the highest, and the power grid side is controlled by a unit power factor.

The rectifier stage of the indirect matrix converter only uses two effective space vectors in a unit switching cycle, that is, a phase current vector fret of an average output at any moment is synthesized by two adjacent effective current effective vectors of a sector where the phase current vector $I_{ref}$ is located; the SVPWM strategy of the rectifier stage without zero vector is represented by $t_\mu$ and $t_\nu$ in two time periods of the unit switching cycle, and the corresponding DC voltages are $u_\mu$ and $u_\nu$, and the corresponding duty ratios are $d_\mu$ and $d_\nu$, respectively.

An average voltage $u_{dc\_av}$ of an intermediate DC link of the indirect matrix converter in the unit switching cycle is expressed as follows $$u_{dc\_sv} = d_\mu \cdot u_\mu + d_\nu \cdot u_\nu = \frac{3u_{im}}{2\cos\theta_{in}}$$

where $\cos\vartheta_{in} = \max\{|\cos\vartheta_a|, |\cos\vartheta_b|, |\cos\vartheta_c|\}$; $\vartheta_a$, $\vartheta_b$, $\vartheta_c$, and $u_{im}$ are the phase angles and amplitude of an input phase voltage of the indirect matrix converter, respectively.

The torque synchronization error $\epsilon$ between the motors in step 2) is defined as follows:

$$\epsilon = T_{e1} - T_{e2}$$

where $T_{e1}$ and $T_{e2}$ are output torques of the two motors, respectively.

In step 2), the two-motor unified prediction model (the discrete state equation thereof) including time delay compensation is as follows:

$$X(k+2) = G(k+1) \cdot X(k+1) + F \cdot U(k+1) + K \cdot D(k+1)$$

$X(k+1) = [i_{d1}(k+1)\ i_{q1}(k+1)\ i_{d2}(k+1)\ i_{q2}(k+1)\ \epsilon(k+1)]^T$;
$U(k+1) = [u_{d1}(k+1)\ u_{q1}(k+1)\ u_{d2}(k+1)\ u_{q2}(k+1)]$; $D(K+1) = [T_s\omega_{r1}(k+1)\psi_{f1}/L_1\ T_s\omega_{r2}(K+1)(k+2)\psi_{f2}/L_2]^T$;
$X(k+1)$ represents a state vector at $(k+1)T_s$; $U(k+1)$ represents an input vector at $(k+1)T_s$; $D(k+1)$ represents a transfer vector at $(k+1)T_s$; $G(k+1)$ represents a state matrix of the two-motor torque synchronization system at $(k+1)T_s$; F represents an input matrix of the two-motor torque synchronization system; K represents a transfer matrix of the two-motor torque synchronization system; $i_{di}(k+1)$ and $i_{qi}(k+1)$ represent the d-axis and q-axis components of a stator current of an $i^{th}$ motor at $(k+1)T_s$, respectively, and i represents the ordinal number of the motor, i=1,2; $\epsilon(k+1)$ represents a torque synchronization error of the two motors at $(k+1)T_s$, and k represents the ordinal number of a control cycle; $u_{di}(k+1)$ and $u_{qi}(k+1)$ represent the d-axis and q-axis components of a stator voltage of the $i^{th}$ motor at $(k+1)T_s$, respectively; $T_s$ is a control cycle of the two-motor torque synchronization system; and $\omega_{ri}(k+1)$, $\psi_{fi}$ and $L_i$ are a rotor angular velocity, a permanent magnet flux linkage and a stator inductance of the $i^{th}$ motor at k+1, respectively.

The two-motor unified prediction model takes the current value of each motor, the torque synchronization error of the two motors and stator voltage at $kT_s$ as input variables, and takes the current value of each motor and the torque synchronization error of the two motors at $(k+2)T_s$ as output variables, considering time delay compensation. In an embodiment, the d-axis and the q-axis components $i_{di}(k)$ and $i_{qi}(k)$ of the stator current of the $i^{th}$ motor at $kT_s$, the torque synchronization error $\epsilon(k)$ of two motors at $kT_s$, and the d-axis and the q-axis components $u_{di}(k)$ and $u_{qi}(k)$ of the stator voltage at $kT_s$ are taken as inputs; after Euler discretization, the delay compensation is considered, and the d-axis and the q-axis components $i_{di}(k+2)$ and $i_{qi}(k+2)$ of the stator current of the $i^{th}$ motor at $(k+2)T_s$ and the torque synchronization error $\epsilon(k+2)$ of the two motors at $(k+2)T_s$ are predicted.

The weighted sum value function in step 3) is:

$$CF = \lambda_d \cdot g_d + \lambda_q \cdot g_q + \lambda_\epsilon \cdot g_\epsilon$$

$$\begin{cases} g_d = |i_d^{ref} - i_{d1}(k+2)| + |i_d^{ref} - i_{d2}(k+2)| = g_{d1} + g_{d2} \\ g_q = |i_q^{ref} - i_{q1}(k+2)| + |i_q^{ref} - i_{q2}(k+2)| = g_{q1} + g_{q2} \\ g_s = |\epsilon(k+2)| = 1.5p_1\psi_{f3}i_{q1}(k+2) - 1.5p_2\psi_{f2}i_{q2}(k+2)| \end{cases}$$

where $g_d$, $g_q$ and $g_\epsilon$ are the current tracking errors of d-axis and q-axis and the torque synchronization error of the two motors, respectively; $\lambda_d$, $\lambda_q$ and $\lambda_\epsilon$ are the weight coefficients of the corresponding errors in the value function, which are obtained by an empirical setting method; $i^{refd}$ and $i^{refq}$ are the reference values of the d-axis current and the q-axis current of the motor respectively, and $p_i$ is the number of pole-pairs of the motor i.

The value function based on the free component of error item in step 3) is as follows:

$$CF_{new} = \tilde{\lambda}_d \cdot \tilde{g}_d + \tilde{\lambda}_q \cdot \tilde{g}_q + \tilde{\lambda}_\epsilon \cdot \tilde{g}_\epsilon$$

$$\begin{cases} \tilde{g}_d = \tilde{g}_{d1} + \tilde{g}_{d2} = \sum_{i=1}^{2}\left|\frac{\tilde{\rho}_{di} + \tau_{di}}{2\tau_{dimax}}\right| \\ \tilde{g}_q = \tilde{g}_{q1} + \tilde{g}_{q2} = \sum_{i=1}^{2}\left|\frac{\tilde{\rho}_{q1} + \tau_{q1}}{2\tau_{q/max}}\right| \\ \tilde{g}_e = \left|\frac{\tilde{\rho}_e + \tau_e}{2\tau_{emax}}\right| \end{cases}$$

where $\tilde{\lambda}_\epsilon$, $\tilde{\lambda}_q$ and $\tilde{\lambda}_d$ are adaptive weight coefficients of the torque synchronization error, d-axis and q-axis current tracking errors, respectively; $\tilde{\rho}_e$, $\tilde{\rho}_{di}$ and $\tilde{\rho}_{qi}$ are the simplified forms of the fixed components of the corresponding errors, respectively; $\tau_\epsilon$, $\tau_{di}$ and $\tau_{qi}$ are the free components of the torque synchronization error, the d-axis and q-axis current tracking errors, respectively.

The value function based on the free component of the error item focuses on the offset degree of the free component of each error to the fixed component, rather than the total value of each error in the value function. At the same time, the error values are normalizeds, which makes the variation range of each error value the same, ranging from 0 to 1, thus facilitating the subsequent weight coefficient design.

The adaptive weight coefficient in step 4) is (taking the weight of the torque synchronization error as an example):

$$\lambda_\epsilon = G_\epsilon \cdot \lambda$$

where $G_\epsilon$ and $\lambda$ are the adaptive factor and initial weight coefficient of the torque synchronization error, respectively;

The adaptive factor is $$G_s = \begin{cases} 1, & \rho_{\varepsilon\_pa} \leq \rho_{lim} \\ 1 + \dfrac{h}{\rho_{lim}} \cdot (\rho_{\varepsilon\_pe} - \rho_{lim}), & \rho_{\varepsilon\_po} > \rho_{lim} \end{cases}$$

$$\rho_{\varepsilon\_p0} = \left| \dfrac{\rho_\varepsilon}{T_N} \right|$$

where $\rho_{lim}$ and h are the fixed component limit value and linear variation coefficient of the adaptive weight factor, respectively; $\rho_{\epsilon\_pu}$ and $T_N$ are the per-unit value of the fixed component of the torque synchronization error and the rated torque of the motor, respectively.

The definition and parameter selection of the adaptive weight coefficients $\tilde{\lambda}_d$ and $\tilde{\lambda}_q$ corresponding to the d-axis and the q-axis current tracking errors are the same as $\tilde{\lambda}_\epsilon$.

In step 4), the process of applying the adaptive weight coefficient to the model predictive current control of the two-motor torque synchronization system is specifically the following online rolling optimization process:

4.1) Obtaining the current values of the two motors at $kT_s$ by sampling, substituting all switch state combinations into the two-motor unified prediction model by considering the delay compensation, calculating the fixed components $\rho_{di}$, $\rho_{qi}$, $\rho_\epsilon$, free components $\tau_{di}$, $\tau_{qi}$, $\tau_\epsilon$, and the simplified form $\tilde{\rho}_{di}$, $\tilde{\rho}_{qi}$, $\tilde{\rho}_\epsilon$ (i=1,2) of the fixed components of the d-axis and q-axis current tracking error and torque synchronization error of the two motors at $(k+2)T_s$.

4.2) Substituting the adaptive weight coefficient of each error item and the error components of the two motors at $(k+2)T_s$ together into the value function based on the free component of the error item for online evaluation.

4.3) Selecting a group of switch state feedbacks that can minimize the value of the value function based on the free component of the error item as the output of the inverter stages of the two motors at $(k+1)T_s$.

4.4) Moving the sampling time back, k=k+1, and repeating the above processes.

Aiming at the two problems of value function form selection and weight coefficient setting strategy in current control of two-motor torque synchronization system model prediction driven by an indirect matrix converter, the present disclosure establishes a two-motor unified prediction model, and by analyzing the composition of each error item of the weighted sum value function, a value function based on the free component of the error item and adaptive weight coefficient is proposed, which better matches the system working condition, thus ensuring the dynamic balance between torque synchronization performance and current tracking performance of the system.

The method can be applied to industrial fields such as multi-motor heavy-load driving, and the like, and has the advantages of realizing the redesign of the error form in the weighted sum value function, realizing the self-adaptive adjustment of the weight coefficient, and avoiding the tedious process of manually adjusting the weight coefficient in the empirical setting method. The torque synchronization performance of the two-motor torque synchronization system and the current tracking performance of a single motor are both considered, thus providing the possibility for expansion to multi-motor systems.

DESCRIPTION OF EMBODIMENTS

The method for model predictive current control of a two-motor torque synchronization system driven by an indirect matrix converter according to the present disclosure will be described in detail with reference to the following embodiments and drawings.

Figure 1:
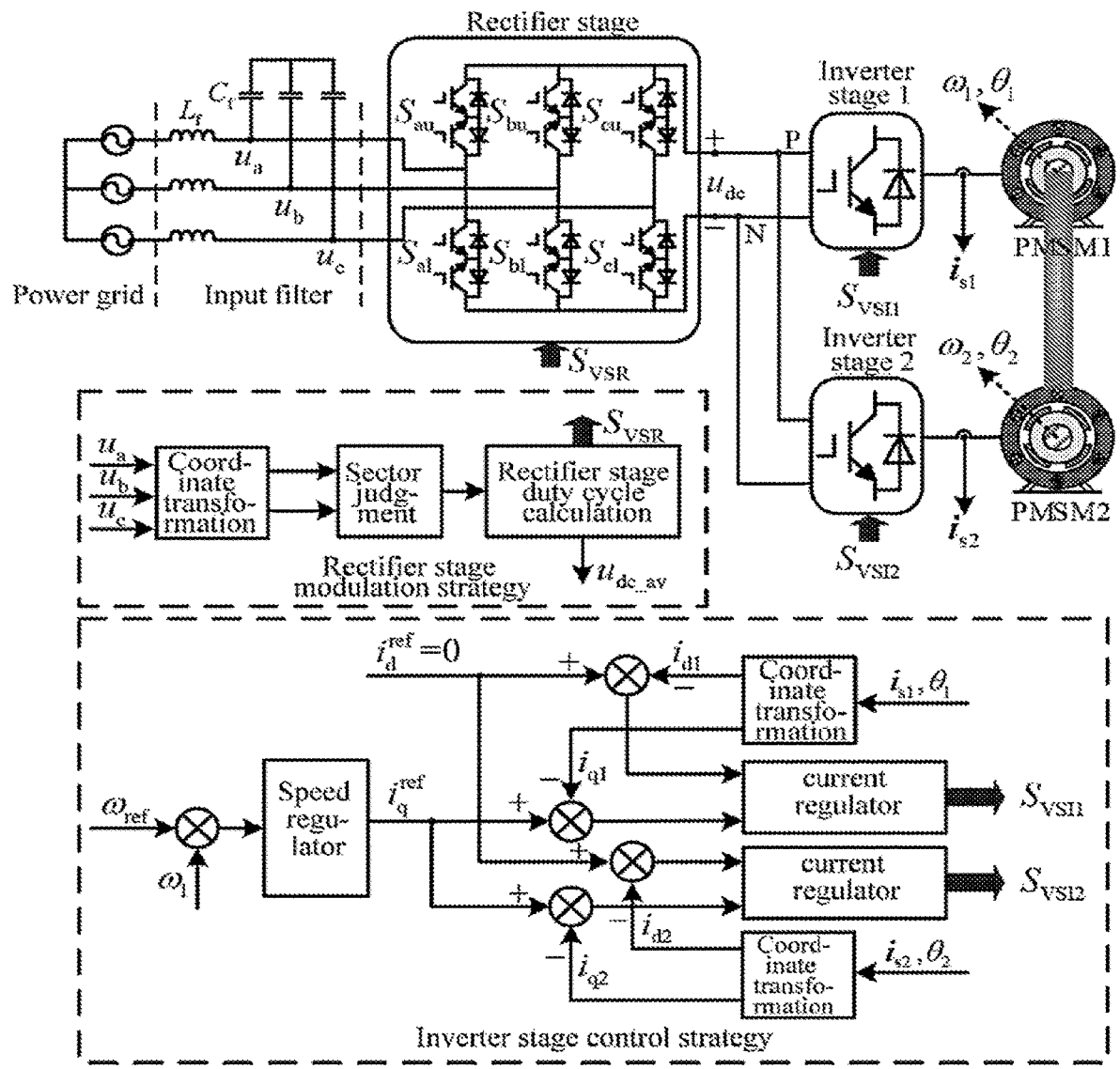
FIG. 1 is a block diagram of the control structure of an indirect matrix converter-two-motor system.

An indirect matrix converter-two-motor system is mainly composed of a three-phase AC input power supply, an input filter, an indirect matrix converter rectifier stage, an inverter stage and two permanent magnet synchronous motors. Its topology is shown in FIG. 1. The rectifier stage consists of six bidirectional switches $S_{mn}$ (m=a,b,c respectively represent three-phase bridge arms; n=u,l represent the upper and lower bridge arms respectively); the two inverter stage converters are the same as the traditional voltage source inverters, each consisting of 6 IGBTs and a reverse recovery diode.

The rectifier DC bus connects two inverter stages, and each inverter stage drives a permanent magnet synchronous motor. The two motors are rigidly connected by coaxial connection, and are controlled by the double closed-loop control structure of speed and current. The control signal is input through the inverter stage to control the current tracking performance and torque synchronization performance of the motors. After the speed error of a motor 1 passes through the speed regulator, it provides the same torque reference signal for both motors. The current inner loop adopts vector control with $i_d=0$. In order to realize the closed-loop control of the torque synchronization error of two motors, a common practice is that two motors adopt independent current loop controllers respectively, and then a coupling link is used to output torque synchronization signals to compensate the torque given values of each motor, and finally the output torque synchronization control is realized. By virtue of the advantages of the simple control structure and fast dynamic response capability of MPCC, the current controllers of two motors are integrated into one MPCC controller, the current inner loop control structure is simplified, and the multi-objective control of the two-motor torque synchronization system is realized.

Figure 2:
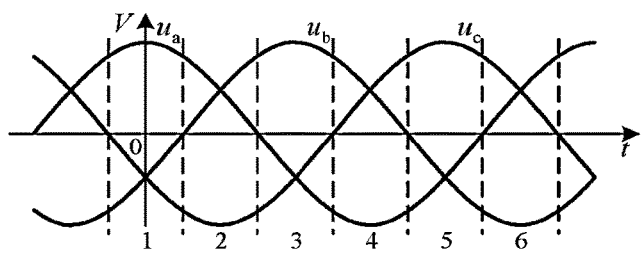
FIG. 2 is a schematic diagram of input voltage sector division.

In order to make the voltage polarity of the DC link positive, maximize the voltage utilization rate, and make the power grid side be controlled by unit power factor, a SVPWM modulation strategy without zero vector is usually adopted in the rectifier stage of the indirect matrix converter. Therefore, according to the method shown in FIG. 2, the input voltage intervals are equally divided according to the zero-crossing point of the input phase voltage, and each interval occupies π/3 electrical angle, and each interval is called a sector. In a unit switching cycle, the DC side of the rectifier stage outputs two relatively large line voltages with positive polarity according to a certain duty ratio. The switching state, output DC voltage and duty ratio of the six-sector rectifier stage are shown in Table 1.

TABLE 1

Switching State and DC Voltage of Six Sector Rectifier Stage

| | First section | | | Second section | | |
|---|---|---|---|---|---|---|
| Sector | Switch on $S_{mn}$ | DC voltage $u_\mu$ | Duty ratio $d_\mu$ | Switch on $S_{mn}$ | DC voltage $u_\nu$ | Duty ratio $d_\nu$ |
| 1 | $S_{au} S_{bl}$ | $u_{ab}$ | $-u_b/u_a$ | $S_{au} S_{cl}$ | $u_{ac}$ | $-u_c/u_a$ |
| 2 | $S_{bu} S_{cl}$ | $u_{bc}$ | $-u_b/u_c$ | $S_{au} S_{cl}$ | $u_{ac}$ | $-u_a/u_c$ |
| 3 | $S_{cu} S_{cl}$ | $u_{bc}$ | $-u_c/u_b$ | $S_{bu} S_{al}$ | $u_{ba}$ | $-u_a/u_b$ |
| 4 | $S_{cu} S_{al}$ | $u_{ca}$ | $-u_c/u_a$ | $S_{bu} S_{al}$ | $u_{cb}$ | $-u_b/u_a$ |
| 5 | $S_{cu} S_{al}$ | $u_{ca}$ | $-u_a/u_c$ | $S_{cu} S_{bl}$ | $u_{cb}$ | $-u_b/u_c$ |
| 6 | $S_{au} S_{bl}$ | $u_{ab}$ | $-us/u_b$ | $S_{cu} S_{bl}$ | | $-u_c/u_b$ |

The average voltage $u_{dc\_av}$ of the intermediate DC link of the indirect matrix converter in unit switching cycle is expressed as follows $$u_{dc\_sv} = d_\mu \cdot u_\mu + d_\nu \cdot u_\nu = \frac{3u_{im}}{2\cos\theta_{in}}$$

where $\cos\cos\vartheta_{in}=\max\{|\cos\vartheta_a|, |\cos\vartheta_b|, |\cos\vartheta_c|\}$; $\vartheta_a$, $\vartheta_b$, $\vartheta_c$, and $u_{im}$ are the phase angles and amplitude of an input phase voltage of the indirect matrix converter, respectively.

Under the d-q axis rotating coordinate system, the voltage equation of the $i^{th}$ surface permanent magnet synchronous motor (SPMSM) is as follows:

$$\begin{cases} \frac{di_{di}}{dt} = -\frac{R_i}{L_i}i_\omega + \omega_{ri}i_{qi} + \frac{u_{di}}{L_i} \\ \frac{di_\psi}{dt} = -\omega_{ri}i_{di} - \frac{R_i}{L_i}i_{qi} + \frac{u_\psi}{L_i} - \frac{\psi_{ti}\omega_{ti}}{L_i} \end{cases} \quad (2)$$

where $i_{di}$ and $i_{qi}$, $u_{di}$ and $u_{qi}$ are d-axis and q-axis components of the stator current and stator voltage, respectively; $R_i$, $L_i$, $\psi_{fi}$ and $\omega_{ri}$ are stator resistance, stator inductance, permanent magnet flux linkage and rotor electrical angular velocity respectively, where $\omega_{ri}=p_i\omega_i$, $\omega_i$ is the mechanical angular velocity of the rotor; $p_i$ is the number of pole-pairs of the motor; i represents the motor serial number, i=1,2.

Euler discretization of formula (2) is carried out, and the state values of the d-axis and q-axis components of the stator current of the $i^{th}$ motor at $(k+1)T_s$ are obtained as follows $$\begin{cases} i_{di}(k+1) = A_i i_{di}(k) + B_i(k)i_{qi}(k) + C_i u_{di}(k) \\ i_{qi}(k+1) = A_i i_{qi}(k) - B_i(k)i_{di}(k) + C_i u_{qi}(k) - D_i(k) \end{cases} \quad (3)$$

where $A_i=1-T_s R_i/L_i$; $B_i(k)=T_s \omega_{ri}(k)$; $C_i=T_s/L_i$; $D_i(k)=T_s \omega_{ri}(k)\psi_{ti}/L_i$; $T_s$ is the control cycle of the system.

The electromagnetic torque equation of the $i^{th}$ motor is $$T_{gi}(k)=1.5p_i\psi_{ti}i_{qi}(k) \quad (4)$$

The two-motor torque synchronization error is defined as $$\epsilon = T_{e1} - T_{e2} \quad (5)$$

There are 64 switch combination states in the inverter stage of the two-motor torque synchronization system driven by an indirect matrix converter. The predicted values of d and q axis current and torque synchronization error at $(k+2)T_s$ can be obtained from the current value at $kT_s$ and the two-motor unified prediction model. Subsequently, the optimal switch combination state is selected as the output of the inverter stage at $(k+1)T_s$ by online evaluation of the value function.

The weighted sum value function is applied in MPCC of the two-motor torque synchronization system driven by an indirect matrix converter. The weighted sum value function has the following form:

$$CF=\lambda_d \cdot g_d + \lambda_q \cdot g_q + \lambda_\epsilon \cdot g_\epsilon \quad (6)$$

$$\begin{cases} g_d = |i_d^{ref} - i_{d1}(k+2)| + |i_d^{ref} - i_{d2}(k+2)| = g_{d1} + g_{d2} \\ g_q = |i_q^{ref} - i_{q1}(k+2)| + |i_q^{ref} - i_{q2}(k+2)| = g_{q1} + g_{q2} \\ g_\epsilon = |\epsilon(k+2)| = |1.5p_1\psi_{f1}i_{q1}(k+2) - 1.5p_2\psi_{f2}i_{q2}(k+2)| \end{cases} \quad (7)$$

where $g_d$, $g_q$ and $g_\epsilon$ are the current tracking errors of d-axis and q-axis and torque synchronization error of the two motors, respectively; $\lambda_d$, $\lambda_q$ and $\lambda_\epsilon$ are the weight coefficients of the corresponding errors in the value function, respectively. In order to facilitate the setting of the weight coefficients, $\lambda_d=\lambda_q=1$, and $\lambda_\epsilon$ is generally obtained by the empirical setting method based on the branch and bound principle; $i_d^{ref}$ and $i_q^{ref}$ are the reference values of d-axis current and q-axis current of the motor, respectively.

Aiming at the problem of setting a plurality of weight coefficients in the weighted sum value function by the empirical setting method, the present disclosure adopts a value function based on the free component of the error item, and proposes an adaptive online setting strategy of weight coefficients.

The specific embodiment of the present disclosure comprises the following steps:

1) The torque synchronization error $\epsilon$ of two motors is introduced into the prediction process as a state variable, the current controllers of the two motors are integrated into one MPCC controller, the current inner loop control structure is simplified, and the closed loop control of torque synchronization error of the two motors is realized through state prediction and rolling optimization, thus improving the torque synchronization performance of the two-motor system.

By taking the d axis current and the q axis current and the torque synchronization error of two motors as state variables, and considering the time delay compensation, a unified prediction model of two motors is established:

$$X(k+2)=G(k+1)\cdot X(k+1)+F\cdot U(k+1)+K\cdot D(k+1) \quad (8)$$

The state vector $X(k+1)=[i_{d1}(k+1)\ i_{q1}(k+1)\ i_{d2}(k+1)\ i_{q2}(k+1)\ \epsilon(k+1)]^T$; the input vector $U(k+1)=[u_{d1}(k+1)\ u_{q1}(k+1)\ u_{d2}(k+1)\ u_{q2}(k+1)]$; the transfer vector $D(k+1)=[D_1(k+1)\ D_2(k+1)]$.

State matrix;

$$G(k+1) = \begin{bmatrix} A_i & B_i(k+1) & 0 & 0 & 0 \\ -B_i(k+1) & A_1 & 0 & 0 & 0 \\ 0 & 0 & A_2 & B_2(k+1) & 0 \\ 0 & 0 & -B_2(k+1) & A_2 & 0 \\ -B_i(k+1)H_1 & A_1H_1 & B_2(k+1)H_2 & -A_2H_2 & 0 \end{bmatrix}$$

Input matrix $$F = \begin{bmatrix} C_1 & 0 & 0 & 0 \\ 0 & C_1 & 0 & 0 \\ 0 & 0 & C_2 & 0 \\ 0 & 0 & 0 & C_2 \\ 0 & H_1C_1 & 0 & -H_2C_2 \end{bmatrix};$$

transfer matrix $$K = \begin{bmatrix} 0 & 0 \\ -1 & 0 \\ 0 & 0 \\ 0 & -1 \\ -H_i & H_2 \end{bmatrix};$$

where $B_i(k+1)=T_s\omega_{ri}(k+1)$; $D_i(k+1)=T_s\omega_{ri}(k+1)\omega_{fi}/L_i$; $H_i=1.5p_i\psi_{fi}$.

2) Based on the two-motor unified prediction model, the composition of each error item in the weighted sum value function is analyzed, and it is concluded that each error item can be divided into fixed component ρ and free component τ. ρ is the fixed component of each error in the value function, which acts independently of the system controller and remains constant in any switch combination state; τ is the free component of each error in the value function, which depends on the action of the controller and has different values in different switch combinations.

Accordingly, the present disclosure designs a value function based on the free component of the error item as follows:

$$CF_{new}=\tilde{\lambda}_d \cdot \tilde{g}_d + \tilde{\lambda}_q \cdot \tilde{g}_q + \tilde{\lambda}_\epsilon \cdot \tilde{g}_\epsilon \quad (9)$$

$$\begin{cases} \tilde{g}_d = \tilde{g}_{d1} + \tilde{g}_{d2} = \sum_{i=1}^{2} \left| \frac{\tilde{\rho}_{di} + \tau_{di}}{2\tau_{dimax}} \right| \\ \tilde{g}_q = \tilde{g}_{q1} + \tilde{g}_{q2} = \sum_{i=1}^{2} \left| \frac{\tilde{\rho}_{qi} + \tau_{qi}}{2\tau_{qimax}} \right| \\ \tilde{g}_\epsilon = \left| \frac{\tilde{\rho}_\epsilon + \tau_\epsilon}{2\tau_{\epsilon max}} \right| \end{cases} \quad (10)$$

where $\tilde{\lambda}_\epsilon$, $\tilde{\lambda}_q$ and $\tilde{\lambda}_d$ are adaptive weight coefficients of the torque synchronization error, d-axis and q-axis current tracking errors, respectively; $\tilde{\rho}_\epsilon$, $\tilde{\rho}_{di}$ and $\tilde{\rho}_{qi}$ represent the simplified forms of the fixed components of the corresponding errors, and their definitions have the same form. By taking $\tilde{\rho}_\epsilon$ as an example, there is $$\tilde{\rho}_\epsilon = \begin{cases} \rho_{\epsilon}, & |\rho_i| \leq \tau_{i,max} \\ \text{sign}(\rho_\epsilon) \cdot \tau_{max} & |\rho_i| > \tau_{i,max} \end{cases} \quad (11)$$

where $\tau_{\epsilon max}$ is the maximum value of the free components of the torque synchronization errors corresponding to different switch combination states.

3) In order to take both the current tracking performance and torque synchronization performance of the two-motor system into account and match the working conditions of the system in real time, the present disclosure designs an adaptive weight coefficient setting strategy. Taking the weight of torque synchronization error as an example, the adaptive weight coefficient is:

$$\tilde{\lambda}_\epsilon = G_\epsilon \cdot \lambda \quad (12)$$

where $G_\epsilon$ and $\lambda$ are the adaptive factor and initial weight coefficient of the torque synchronization error, respectively. The adaptive factor is $$G_\epsilon = \begin{cases} 1, & \rho_{\epsilon\_pu} \leq \rho_{lim} \\ 1 + \frac{h}{\rho_{lim}} \cdot (\rho_{\epsilon\_pu} - \rho_{lim}), & \rho_{\epsilon\_pu} > \rho_{lim} \end{cases} \quad (13)$$

$$\rho_{s\_pu} = \left| \frac{\rho_\epsilon}{T_N} \right| \quad (14)$$

where $\rho_{lim}$ and h are the fixed component limit value and linear variation coefficient of the adaptive weight factor, respectively; $\rho_{\epsilon\_pu}$ and $T_N$ are the per-unit value of the fixed component of the torque synchronization error and the rated torque of the motor, respectively.

The definition and parameter selection of the adaptive weight coefficients $\tilde{\lambda}_d$ and $\tilde{\lambda}_q$ corresponding to d-axis and q-axis current tracking errors are similar, in which the initial weight coefficient of the d-axis current tracking error is 1-λ and the initial weight coefficient of the q-axis current tracking error is λ.

Figure 3:
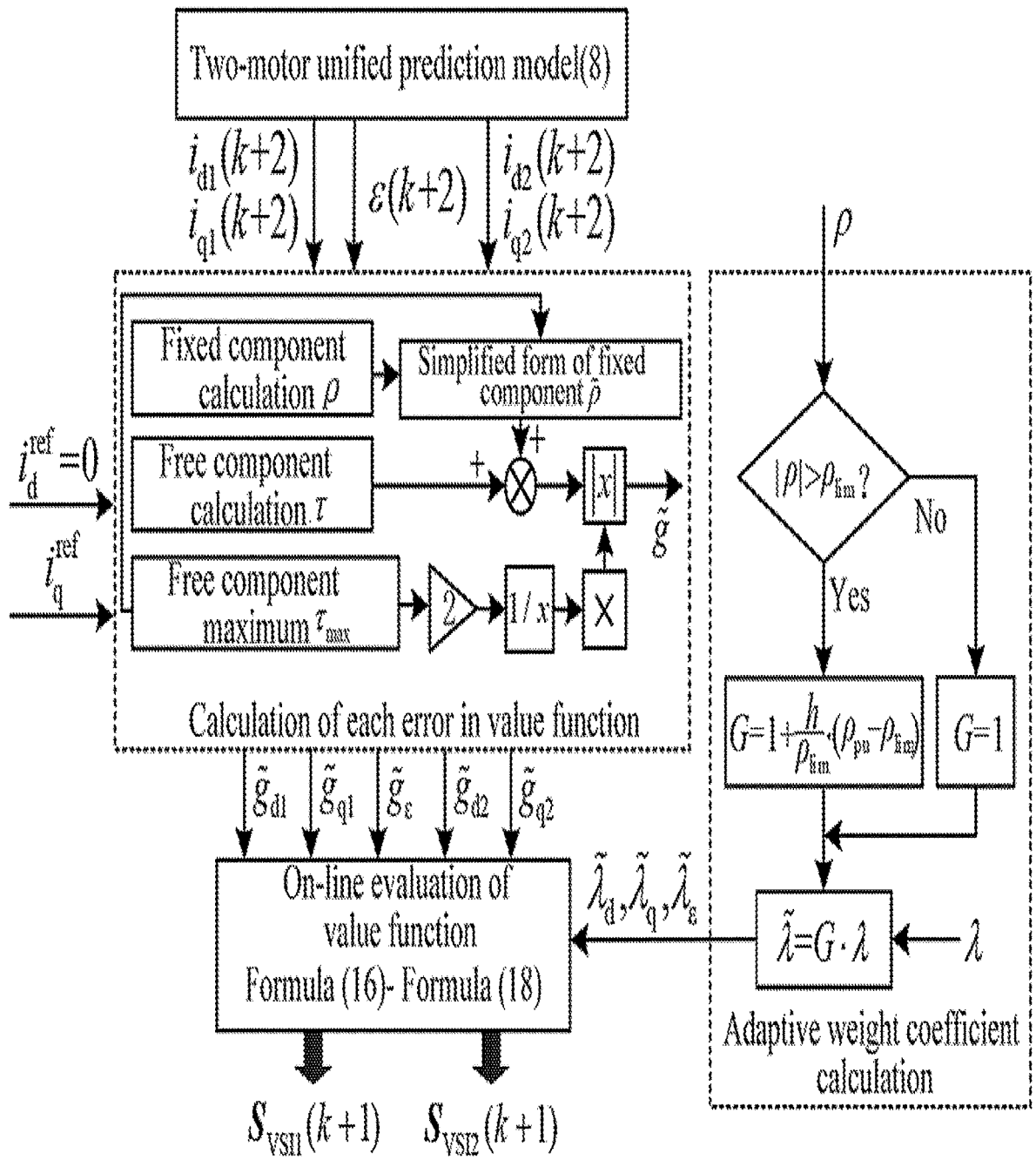
FIG. 3 is a schematic diagram of the MPCC predictive control structure of the present disclosure.

In a unit switching cycle, the controller adjusts the weight coefficient online and in real time through adaptive factors according to the system running state, which provides a practical method for the design of the weight coefficient. The adaptive weight coefficient can improve the adaptability of the system while maintaining the stable operation of the system. The adaptive weight coefficient of each error item obtained by online calculation is applied to the model prediction current control online rolling optimization process of the two-motor torque synchronization system, as shown in FIG. 3, and the process can be summarized as follows:

1) The current values of the two motors were obtained at $kT_s$ by sampling, all switch state combinations were substituted by considering the delay compensation into the two-motor unified prediction model, and the fixed components $\rho_{di}$, $\rho_{qi}$, $\rho_\epsilon$, free components $\tau_{di}$, $\tau_{qi}$, $\tau_\epsilon$ and the simplified form $\tilde{\rho}_{di}$, $\tilde{\rho}_{qi}$, $\tilde{\rho}_\epsilon$ (i=1,2) of the fixed components of the d-axis and q-axis current tracking error and torque synchronization error of the two motors at $(k+2)T_s$ were calculated.

2) The adaptive weight coefficient of each error item and the error components of the two motors at $(k+2)T_s$ were substituted into the value function based on the free component of the error item for online evaluation.

3) A group of switch state feedbacks that can minimize the value of the value function is selected based on the free component of the error item as the output of the inverter stages of the two motors at $(k+1)T_s$.

4) The sampling time was moved back, k=k+1, and the above processes were repeated.

To sum up, in the method for model predictive current control of the two-motor torque synchronization system driven by an indirect matrix converter, the rectifier stage adopts a simple modulation solution with unit power factor controllability. The two motors and inverter stage adopt MPCC strategy, which can realize the independent control of the power grid side and motor side of the system. The value function based on the free components of error items and the adaptive weight coefficients provided by the present disclosure quantifies the offset degree of the free components of each error item to the fixed components, and adjusts the weight coefficients online through the adaptive factors, thereby improving the selection mechanism of the optimal voltage vector combination of the system, and simultaneously reducing the complexity and calculation amount of the system design. The MPCC strategy provided by the present disclosure can restrain the torque synchronization error and improve the torque synchronization performance of the system while ensuring the current tracking performance of the system, thereby realizing the dynamic balance of the performance of a plurality of control variables, and providing the possibility for expansion to a multi-motor system.

The present disclosure is not limited to the embodiments described above. The above description of specific embodiments is intended to describe and illustrate the technical solution of the present disclosure, and the above specific embodiments are illustrative but not restrictive. Without departing from the spirit and scope of the present disclosure, those skilled in the art can make other specific changes in various forms under the inspiration of the present disclosure, which are all within the scope of the present disclosure.

What is claimed is:

1. A method for model predictive current control for a two-motor torque synchronization system, wherein the method is suitable for a two-motor torque synchronization system driven by an indirect matrix converter and comprises:
   1) Generating a PWM control signal through a rectifier stage controller by a rectifier stage of the indirect matrix converter adopting a space vector modulation strategy without zero vector, and providing a stable and reliable DC output voltage for an inverter stage of the indirect matrix converter subsequently,
   2) Establishing a two-motor unified prediction model by taking the two-motor torque synchronization system driven by two coaxially and rigidly connected motors with a same load as a subject, torque synchronization performance and current tracking performance between the motors as main control objectives, and a current value of each motor and a torque synchronization error $\epsilon$ between the motors as a state variable,
   3) Inputting the state variable and an input voltage of a previous moment, obtaining a predicted value of the state variable at a next moment as an output through the two-motor unified prediction model, analyzing a composition of each error item in a weighted sum value function in a value function evaluation unit for model predictive current control, normalizing each error value by focusing on an offset degree of a free component of each error to a fixed component, and proposing a value function based on the free component of the error item, and
   4) Proposing an adaptive weight coefficient without artificial iterative comparison and applying the adaptive weight coefficient to a model prediction current control of the two-motor torque synchronization system for selecting the weight coefficient in the value function based on the free component of the error item; adjusting the weight coefficient online and in real time by an adaptive factor according to a running state of the system, and meeting requirements of various working conditions with expected torque synchronization performance and current tracking performance of the system into account.

2. The method for model predictive current control for a two-motor torque synchronization system according to claim 1, wherein said rectifier stage of the indirect matrix converter adopting a space vector modulation strategy without zero vector in step 1) is as follows:
   the rectifier stage of the indirect matrix converter adopts an SVPWM modulation strategy without zero vector so that a voltage polarity of a DC link is positive, wherein the voltage utilization ratio is the highest, and the power grid side is controlled by a unit power factor,
   the rectifier stage of the indirect matrix converter only uses two effective space vectors in a unit switching cycle, that is, a phase current vector $I_{ref}$ of an average output at any moment is synthesized by two adjacent effective current effective vectors of a sector where the phase current vector $I_{ref}$ is located,
   where the SVPWM strategy of the rectifier stage without zero vector is denoted as $t_\mu$ and $t_\nu$ in two time periods of the unit switching cycle, the corresponding DC voltages are denoted as $u_\mu$ and $u_\nu$, and the corresponding duty ratios are denoted as $d_\mu$ and $d_\nu$, respectively, and
   an average voltage $u_{dc\_av}$ of an intermediate DC link of the indirect matrix converter in the unit switching cycle is expressed as follows:

$$u_{dc\_sv} = d_\mu \cdot u_\mu + d_\nu \cdot u_\nu = \frac{3u_{im}}{2\cos\theta_{in}}$$

where $\cos\theta_{in} = \max\{|\cos\theta_a|, |\cos\theta_b|, |\cos\theta_c|\}$; $\theta_a$, $\theta_b$, $\theta_c$ and $u_{im}$ represent phase angles and amplitude of an input phase voltage of the indirect matrix converter, respectively.

3. The method for model predictive current control of a two-motor torque synchronization system according to claim 1, wherein the torque synchronization error $\epsilon$ between the motors in step 2) is defined as follows:

$$\epsilon = T_{e1} - T_{e2}$$

where $T_{e1}$ and $T_{e2}$ are output torques of the two motors, respectively.

4. The method for model predictive current control of a two-motor torque synchronization system according to claim 1, wherein a discrete state equation of the two-motor unified prediction model in step 2) comprising time delay compensation is as follows:

$$X(k+2) = G(k+1) \cdot X(k+1) + F \cdot U(k+1) + K \cdot D(k+1)$$

where $X(k+1) = [i_{d1}(k+1)\ i_{q1}(k+1)\ i_{d2}(k+1)\ i_{q2}(k+1)\ \epsilon(k+1)]^T$; $U(k+1) = [u_{d1}(k+1)\ u_{q1}(k+1)\ u_{d2}(k+1)\ u_{q2}(k+1)]$; $D(K+1) = [T_s\omega_{r1}(k+1)\psi_{f1}/L_1\ T_s\omega_{r2}(K+1)(k+2)\psi_{f2}/L_2]^T$, and where $X(k+1)$ represents a state vector at $(k+1)T_s$, $U(k+1)$ represents an input vector at $(k+1)T_s$, $D(k+1)$ represents a transfer vector at $(k+1)T_s$, $G(k+1)$ represents a state matrix of the two-motor torque synchronization system at $(k+1)T_s$; F represents an input matrix of the two-motor torque synchronization system; K represents a transfer matrix of the two-motor torque synchronization system; $i_{di}(k+1)$ and $i_{qi}(k+1)$ represent d-axis and q-axis components of a stator current of an $i^{th}$ motor at $(k+1)T_s$, respectively, and i represents the ordinal number of the motor, i=1,2; $\epsilon(k+1)$ represents a torque synchronization error of the two motors at $(k+1)T_s$, and k represents the ordinal number of a control cycle; $u_{di}(k+1)$ and $u_{qi}(k+1)$ represent d-axis and q-axis components of a stator voltage of the $i^{th}$ motor at $(k+1)T_s$, respectively, $T_s$ is a control cycle of the two-motor torque synchronization system, and $\omega_{ri}(k+1)$, $\psi_{fi}$ and $L_i$ are a rotor angular velocity, a permanent magnet flux linkage and a stator inductance of the $i^{th}$ motor at k+1, respectively.

5. The method for model predictive current control of a two-motor torque synchronization system according to claim 4, wherein the weighted sum value function in step 3) is:

$$CF = \lambda_d \cdot g_d + \lambda_q \cdot g_q + \lambda_\epsilon \cdot g_\epsilon$$

$$\begin{cases} g_d = |i_d^{ref} - i_{d1}(k+2)| + |i_d^{ref} - i_{d2}(k+2)| = g_{d1} + g_{d2} \\ g_q = |i_q^{ref} - i_{q1}(k+2)| + |i_q^{ref} - i_{q2}(k+2)| = g_{q1} + g_{q2} \\ g_\epsilon = |\epsilon(k+2)| = |1.5 p_1 \psi_{f1} i_{q1}(k+2) - 1.5 p_2 \psi_{f2} i_{q2}(k+2)| \end{cases}$$

where $g_d$, $g_q$ and $g_\epsilon$ are d-axis and q-axis current tracking errors and the torque synchronization error of the two motors, respectively, $\lambda_d$, $\lambda_q$ and $\lambda_\epsilon$ are the weight coefficients of the corresponding errors in the value function obtained by an empirical setting method; $i_{refd}$ and $i_{refq}$ are the reference values of d-axis current and q-axis current of the motor, respectively, and $p_i$ is the number of pole-pairs of the motor.

6. The method for model predictive current control of a two-motor torque synchronization system according to claim 1, wherein the value function based on the free component of the error item in step 3) is as follows:

$$CF_{new} = \tilde{\lambda}_d \cdot \tilde{g}_d + \tilde{\lambda}_q \cdot \tilde{g}_q + \tilde{\lambda}_\epsilon \cdot \tilde{g}_\epsilon$$

$$\begin{cases} \tilde{g}_d = \tilde{g}_{d1} + \tilde{g}_{d2} = \sum_{i=1}^{2} \left| \frac{\tilde{\rho}_{di} + \tau_{di}}{2\tau_{dimax}} \right| \\ \tilde{g}_q = \tilde{g}_{q1} + \tilde{g}_{q2} = \sum_{i=1}^{2} \left| \frac{\tilde{\rho}_{qi} + \tau_{qi}}{2\tau_{qimax}} \right| \\ \tilde{g}_\epsilon = \left| \frac{\tilde{\rho}_\epsilon + \tau_\epsilon}{2\tau_{\epsilon max}} \right| \end{cases}$$

where $\tilde{\lambda}_\epsilon$, $\tilde{\lambda}_q$, and $\tilde{\lambda}_d$ are adaptive weight coefficients of the torque synchronization error, d-axis and q-axis current tracking errors, respectively; $\tilde{\rho}_\epsilon$, $\tilde{\rho}_{di}$ and $\tilde{\rho}_{qi}$ are the simplified forms of the fixed components of the corresponding errors respectively; $T_\epsilon$, $T_{di}$ and $T_{qi}$ are free components of the torque synchronization error and the d-axis and the q-axis current tracking errors, respectively.

7. The method for model predictive current control of a two-motor torque synchronization system according to claim 6, wherein the adaptive weight coefficient in step 4) is: a weight of the torque synchronization error is:

$$\tilde{\lambda}_\epsilon = G_\epsilon \cdot \lambda$$

where $G_\epsilon$ and $\lambda$ are the adaptive factor and the initial weight coefficient of the torque synchronization error, respectively;

the adaptive factor is $$G_\epsilon = \begin{cases} 1, & \rho_{\epsilon\_pu} \leq \rho_{lim} \\ 1 + \frac{h}{\rho_{lim}} \cdot (\rho_{\epsilon\_pu} - \rho_{lim}), & \rho_{\epsilon\_pu} > \rho_{lim} \end{cases}$$

$$\rho_{\epsilon\_pu} = \left| \frac{\rho_\epsilon}{T_N} \right|$$

where $\rho_{lim}$ and h are a fixed component limit value and a linear variation coefficient of the adaptive weight factor, respectively; $\rho_{\epsilon\_pu}$ and $T_N$ are a per-unit value of the fixed component of the torque synchronization error and the rated torque of the motor, respectively; and the definition and parameter selection of the adaptive weight coefficients $\tilde{\lambda}_d$ and $\tilde{\lambda}_q$ corresponding to the d-axis and the q-axis current tracking errors are the same with the adaptive weight coefficient of the torque synchronization error $\tilde{\lambda}_\epsilon$.

8. The method for model predictive current control of a two-motor torque synchronization system according to claim 1, wherein in step 4), the step of applying the adaptive weight coefficient to the model predictive current control of the two-motor torque synchronization system comprises following online rolling optimization sub-steps:

4.1) obtaining current values of the two motors at $kT_s$ by sampling, substituting all switch state combinations into the two-motor unified prediction model and by considering the delay compensation, calculating fixed components $\rho_{di}$, $\rho_{qi}$, $\rho_\epsilon$, free components $T_{di}$, $T_{qi}$, $T_\epsilon$ and simplified forms $\tilde{\rho}_{di}$, $\tilde{\rho}_{qi}$, $\tilde{\rho}_\epsilon$ (i=1,2) of the fixed components of d-axis q-axis current tracking errors and the torque synchronization error of the two motors at $(k+2)T_s$;

4.2) substituting the adaptive weight coefficient of each error item and the error components of the two motors at $(k+2)T_s$ together into the value function based on the free component of the error item for online evaluation;

4.3) selecting a group of switch state feedbacks that is capable of minimizing the value of the value function based on the free component of the error item as output of the inverter stages of the two motors at $(k+1)T_s$; and 4.4) moving sampling time back, k=k+1, and repeating above steps.

\* \* \* \* \*